J. W. DAVIES.
MACHINE FOR TREATING LIQUIDS.
APPLICATION FILED JAN. 5, 1910.

1,026,947.

Patented May 21, 1912.

Witnesses.
H.C.Witt
R.G.Blanc

Inventor.
John W. Davies
By Henry J. Miller
atty.

UNITED STATES PATENT OFFICE.

JOHN W. DAVIES, OF READING, MASSACHUSETTS, ASSIGNOR TO MANTON-GAULIN MANUFACTURING COMPANY, OF BOSTON, MASSACHUSETTS, A CORPORATION OF MAINE.

MACHINE FOR TREATING LIQUIDS.

1,026,947. Specification of Letters Patent. Patented May 21, 1912.

Application filed January 5, 1910. Serial No. 536,573.

*To all whom it may concern:*

Be it known that I, JOHN W. DAVIES, of Reading, in the county of Middlesex and State of Massachusetts, have invented certain new and useful Improvements in Machines for Treating Liquids, of which the following is a specification, reference being had to the accompanying drawings, forming part thereof.

This invention relates to improvements in machines for treating milk or other liquid or material containing fat or to which fat is to be supplied to form an emulsion.

The object of this invention is to so construct a machine of this nature that milk or other liquid or material containing segregated particles or globules of fatty matter or other material, which it is desired to emulsify, may be so treated by the machine that the said segregated particles or globules of fat or other matter may be disrupted and their constituents distributed through the milk, liquid or other material, forming the carrying medium, to form a homogeneous emulsion.

The invention consists in the peculiar means for disrupting the fatty globules or particles and mixing the same with the carrying liquid.

The invention also consists in such other novel features of construction and combination of parts as shall hereinafter be more fully described and pointed out in the claims.

Figure 1:
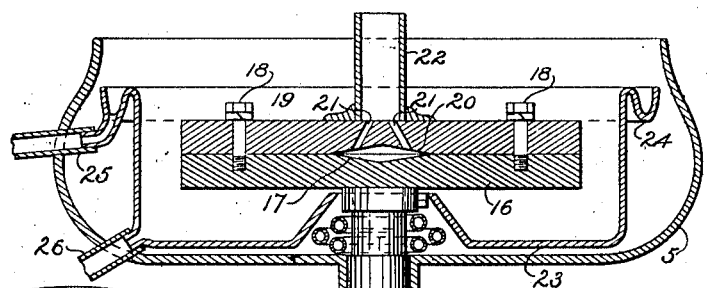
Figure 2:
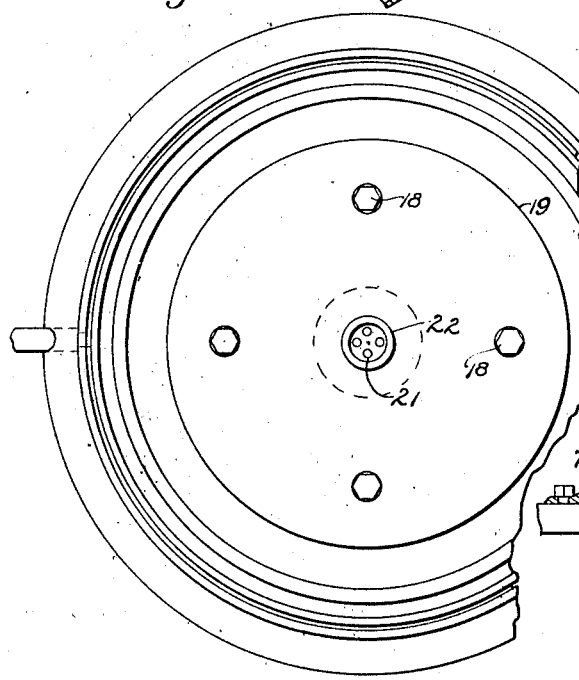
Figure 3:
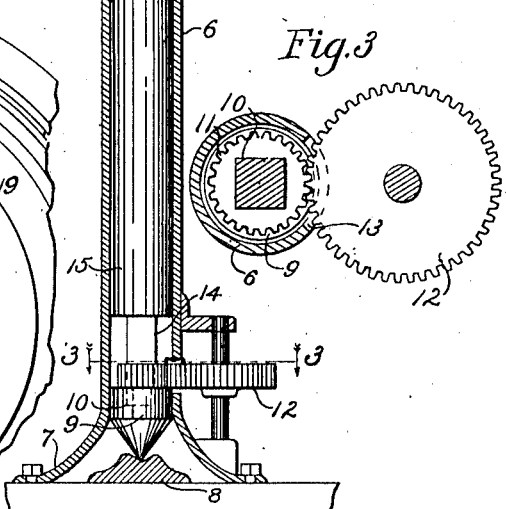

Figure 1 represents a vertical sectional view of the improved machine for treating liquids taken on line 1—1 Fig. 2. Fig. 2 represents a plan view of parts of the same. Fig. 3 represents a cross sectional view taken on line 3—3 Fig. 1.

Similar numbers of reference designate corresponding parts throughout.

As shown in the drawings, in its preferred form 5 indicates an outer chamber mounted on a tubular standard 6 furnished at its lower portion with the base 7 containing the step bearing 8. Within the lower portion of said tubular standard 6 is journaled the shaft member 9 which is supported by the step bearing 8 and is furnished with the square socket 10 and the gear 11 which latter is driven by the gear 12 operating through the opening 13 in the wall of said tubular standard.

Removably engaged with the socket 10 of shaft member 9 is the shank 14 of the shaft 15 which latter is journaled in the standard 6 and, at its upper end, is provided with the plate 16 having the axially disposed depression or concavity 17. Secured to said plate 16, by a series of bolts 18, 18, is the upper plate 19 having the axially disposed inverted depression or concavity 20 and a series of channels 21, 21 communicating with said concavity 20 and with the axially disposed liquid receiving chamber 22 at the upper surface of said plate 19.

Embracing the liquid treating mechanism, formed by the plates or mixing elements 16 and 19, is the pan 23 having at its upper portion the exterior trough 24 furnished with the drain pipe 25; extending through the wall of chamber 5, and the lower portion of the pan 23 having the drain pipe 26.

The meeting faces of the plates 16 and 19 are preferably flat and said faces are held in contact by bolts 18, 18 which extend through smooth bores in plate 19 and are secured in screw threaded sockets in plate 16. In practice it is found that the bolts 18, 18 should preferably be screwed down sufficiently to bring the meeting faces of plates 16 and 19 approximately in intimate contact in order to offer resistance to the passage of liquid between said plates.

Gear 12 is operated in any ordinary manner to effect the rotation of gear 11, its shaft member 9 and shaft 15, with the liquid treating elements formed by the plates 16 and 19, at a high speed.

Milk or other liquid or material containing fatty matter, generally in segregated globules, is supplied to the receiving chamber 22 and passes downward through the channels 21, 21 into the chamber, formed between the faces of plates 16 and 19 by the depressions 17 and 20 and, under centrifugal action caused by the rotation of said plates, said liquid is driven outward, between the flat faces of said plates 16 and 19, in a thin film while the fatty matter is so flattened, by being forced between said plates, that the globules are distended until disruption occurs and the constituents thereof are so mixed with the thinner liquid, by reason of the circulation of said liquid between the plates 16 and 19, that the fatty matter is distributed homogeneously throughout the liquid. As the homogenized liquid passes from between the plates 16 and 19 it enters the pan 23, the contents of which are further mixed by the continued centrifugal delivery of additional liquid, and from said pan the greater portion of the liquid is preferably drawn off through the pipe 26. I find, however, that the centrifugal action of the liquid, delivered from between the plates 16 and 19 into the pan 23, is so considerable that said liquid tends to creep up the wall of the pan and, to receive such liquid, I provide the upper edge of the pan 23 with the annular trough 24 from which the liquid is drained through the pipe 25.

When it is desired to remove the pan 23 from the chamber 5 the plates 16 and 19 with the shaft 15 are first lifted out and the pan 23 may then be removed. In replacing said plates 16 and 19 and their shaft 15 it is of course necessary that the shank 14 of shaft 15 be engaged in the socket 10 of shaft member 9.

It is of course obvious that the plates 16 and 19 may be rotatably mounted and driven in any desired manner to effect the centrifugal action on the liquid supplied between said plates. It is also evident that the shape of said plates, particularly as regards their meeting or compression faces, may be varied from that herein shown, and I place no limitation on the material from which said plates or mixing members 16 and 19 are to be manufactured.

Having thus described my invention I claim as new and desire to secure by Letters Patent—

1. A machine for treating liquid of the nature described comprising a pair of rotatable members having their faces in annular contact, and devices for pressing said members together.

2. A machine for treating liquid of the nature described comprising a pair of rotatable members having their faces in contact and having a chamber embraced by said contacting faces and bolts extending through one of said members and adjustably secured in the other of said members, substantially as described.

3. A machine for treating liquids of the nature described comprising a pair of rotatable members having annular contacting faces, a chamber embraced by said faces, ducts communicating with said chamber, bolts for securing said faces in contact, and means for receiving the liquid after it has passed between said members.

JOHN W. DAVIES.

Witnesses:
 H. J. MILLER,
 C. E. HACKEBARTH.